United States Patent [19]

Kunikane et al.

[11] Patent Number: 4,460,665
[45] Date of Patent: Jul. 17, 1984

[54] OPTICAL INFORMATION RECORDING MEDIUM

[75] Inventors: Makoto Kunikane, Chigasaki; Michiharu Abe; Masaakira Umehara, both of Yokohama, all of Japan

[73] Assignee: Ricoh Co., Ltd., Tokyo, Japan

[21] Appl. No.: 452,238

[22] Filed: Dec. 22, 1982

[30] Foreign Application Priority Data

Dec. 28, 1981 [JP] Japan .................................. 56-209929
Dec. 6, 1982 [JP] Japan .................................. 57-212663

[51] Int. Cl.³ ........................ B32B 3/16; B05D 5/06
[52] U.S. Cl. .................................. 428/199; 346/76 L; 346/135.1; 428/201; 428/332; 428/336; 428/411; 428/913; 430/945

[58] Field of Search ............... 428/411, 913, 332, 336, 428/199, 201; 346/76 L, 135.1; 430/945

[56] References Cited

U.S. PATENT DOCUMENTS 4,373,020  2/1983  Winslow ......................... 428/913 X
4,397,923  8/1983  Yasuda et al. .................. 428/913 X Primary Examiner—Thomas J. Herbert
Attorney, Agent, or Firm—Flynn, Thiel, Boutell & Tanis

[57] ABSTRACT

An optical information recording medium comprises a transparent or opaque substrate and a cyanine coloring matter-containing thin coloring matter layer formed on said substrate. This recording material is adapted for laser beam reading and writing.

17 Claims, 1 Drawing Figure

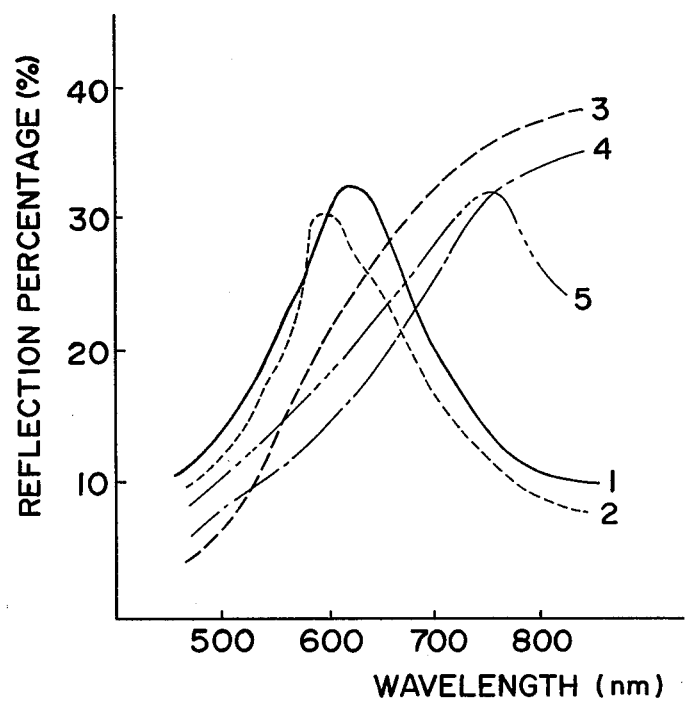

OPTICAL INFORMATION RECORDING MEDIUM

BACKGROUND OF THE INVENTION (a) Field of the Invention

The present invention relates to an optical information recording medium, and in particular relates to an optical information recording medium for use in writing and reading with a high density energy beam such as a laser beam.

(b) Description of the Prior Art

A great number of optical information recording mediums for use in writing and reading with a high density energy beam (for instance, a laser beam) have been proposed up to the present. As typical ones there can be enumerated the recording medium prepared by providing a vapor deposition film of a metal, semimetal or nonmetal on the substrate and the recording medium prepared by coating silver halide emulsion onto the substrate and heating same to form the reflective layer thereon (Japanese Laid Open Patent Application No. 108995/1980).

As the recording layers (said vapor deposition films or reflective films) for use in laser recording mediums there are known (1) thin metal films with holes melt-formed by laser radiation, (2) composite lustrous vapor deposited films whose reflective index is reduced at some spots by laser radiation, (3) thin films of dyes or other coating agents that can be removed at some spots by laser radiation, and (4) dielectric substances in which the reflective index is varied at some spots by laser radiation and light diffusion is caused when scanned with a reading laser beam.

However, the recording mediums using vapor deposition films of metal, semimetal or nonmetal, which are generally prepared by a vacuum molding method of batch type rather than continuous type, are defective in that they are expensive, and further it is difficult to obtain mass-produced, uniform quality products, because a number of batches are employed therein. On the other hand, the process of forming the reflective layer by coating silver halide emulsion onto the substrate and heating same is superior in mass-productivity due to the employment of the coating method, but involves the problem that the S/N ratio becomes low due to the presence of silver particle-dispersion system.

In addition, the so-called "DRAW" mediums, that are capable of direct read after write, are asked to meet the requirements that (1) the reflective index must be high due to the necessity of controlling the focus in the range of $\pm 1\mu$ and the tracking in the range of $\pm 0.1\mu$ upon record reading, and (2) a strong absorption laser beam is used. As materials capable of satisfying such requirements there have usually been employed metals. However, the use of metals involves such problems as mentioned above.

SUMMARY OF THE INVENTION

The primary object of the present invention is to provide an optical information recording medium that can exhibit uniform quality as well as high S/N ratio.

The secondary object of the present invention is to provide an optical information recording medium that can exhibit a high reflective index by the use of cyanine coloring matters as materials other than metals with strong absorption of the laser beam used.

The present invention has been accomplished based on the discovery that when a thin film containing cyanine coloring matter is formed on a substrate, this coloring matter displays a strong reflective index in the vicinity of the coloring matter's light absorption region on the substrate.

According to the present invention, there can be provided an optical information recording medium characterized by the provision of a cyanine coloring matter-containing thin coloring matter layer on a substrate.

The present invention permits provision of other layers such as a protective layer, adhesive layer and the like on or under the coloring matter layer depending upon the application. The abovementioned thin coloring matter layer suitably has the metallic reflection that the coloring matter displays at a specific light wavelength region, and in practice has a reflection index of 20% or more, preferably 30% or more, against the laser wavelength used for writing and reading. This reflection is different from said metallic reflection because the former has a specific color, but can have a high reflection index against the wavelength of laser beam used in record regeneration, whereby it can increase the light amount used for information reading and enhance the S/N ratio of the reading signal. In this connection, it is to be understood that the present invention permits use of the cyanine coloring matter singly or in combination with other coloring matters or compounds.

The substrate materials used in the present invention may be those well known to the ordinary worker in the art and may be either transparent or opaque to the laser beam used. However, in case where record writing is effected from the substrate side with a laser beam, the substrate material must be transparent to the writing laser beam. On the other hand, in case where record writing is effected from the side opposite to the substrate, namely the surface of the recording layer, there is no necessity that the substrate material should be transparent the writing laser beam. However, if reading regeneration is carried out with a transparent light, the substrate must be transparent to the reading laser beam. If reading regeneration is carried out with a catoptric light, the substrate material may be either transparent or opaque to the reading laser beam. Referring to the quality of the substrate material, there may be employed the supports generally used for recording elements made of glass, quartz, ceramics, plastics, paper, plate-like or foil-like metal and the like. Among them, plastics are particularly suitable in the points of safety, improved recording sensitivity, flatness, light weight, workability and the like. The typical plastics include vinyl chloride resin, vinyl acetate resin, acrylic resin, methacrylic resin, polyester resin, nitrocellulose, polyethylene resin, polypropylene resin, polyamide resin, polystyrene resin, polycarbonate resin, epoxy resin and the like.

The cyanine coloring matters used in the present invention may be selected optionally. However, preferable cyanine coloring matters are compounds having two unsubstituted or substituted nitrogenous heterocycles which are bonded by at least one methine chain or substituted methine chain or a group having these methine chains.

When such coloring matters are used in the optical information recording medium of the present invention, its recording sensitivity (writing and reading) is enhanced. This is considered attributable to the fact that the methine chain-N conjugated structure exhibits a large absorption coefficient. Further, the reflectivity required for reading is enhanced, which is considered attributable to the fact that since the molecular orientation is linear, the formed film is also improved in orientation.

In view of the fact that among these coloring matters, those having a positive charge exhibit a particularly large absorption coefficient, the use of the last-mentioned coloring matters in the optical information recording medium of the present invention can attain especially satisfactory results.

Next, merely by way of explanation there will be recited the cyanine coloring matters having the structure as defined above, in particular having a positive charge, without limiting thereto.

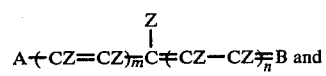

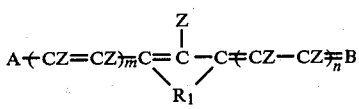

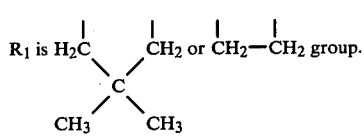

B is a nitrogenous heterocyclic group which will be exemplified hereinafter:

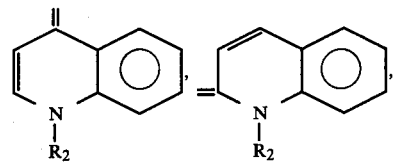

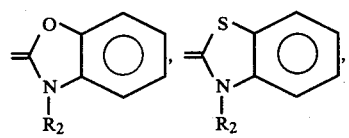

group, or an alkyl, alkoxy, hydroxy, acetyl, aryl or halogen substituent thereof, in which $R_2$ is an alkyl, alkoxyalkyl, hydroxyalkyl, aralkyl, carboxyalkyl, carboxylato alkyl bonded with an alkali metal cation, sulfoalkyl or sulfonatoalkyl group.

A is a nitrogenous heterocyclic group having a positive charge, which will be exemplified hereinafter:

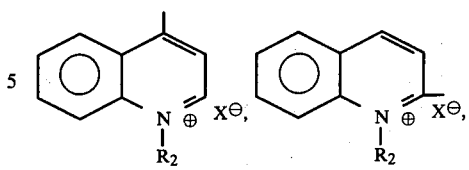

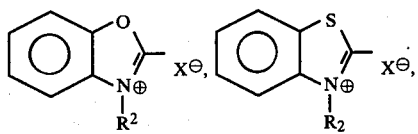

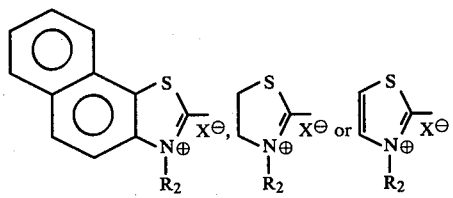

alkoxy, hydroxy, acetyl, aryl or halogen substituent thereof, in which $R_2$ is the same as in said B and X is a counter ion, for instance, such as halogen.

Z is H, —OH, —COOH, halogen $C_1$-$C_5$ alkyl, phenyl, N-substituted amino, N-substituted alkyl, substituted or unsubstituted aryl, or —COOR' (wherein R' is $C_1$-$C_5$ alkyl, phenyl or substituted phenyl group), and said Z, when plural, may be the same or different, and m and n are each an integer of 0, 1, 2 or 3 with the proviso $m+n \leq 3$.

The thin coloring matter layer of the present invention may be formed by coating method, vapordeposition method and the like. Among them, however, the coating method is preferable.

When using the coating method, the formation of said layer can be effected in the manner of coating an organic solvent containing a cyanine coloring matter together with additives such as a binder and others if needed on a substrate and drying the same at room temperature. The organic solvents used suitably in the present invention include for instance methanol, ethanol, methylene dichloride and the like. Coating is effected by usual known methods such as spraying, rollercoating, dipping, spinning and the like. Among additives, the binder is used effectively because it is available for making the coating thickness uniform. As such binders there can be enumerated polyvinyl butyral, cellulose acetate, polyvinyl acetate, acrylic or methacrylic resin, polyester resin, polyamide resin and the like. The other additives include an antioxidant (for instance, phenol resin), an infrared ray absorbent and an ultraviolet ray absorbent. The latter two are utilized to prevent degradation caused by light. The thickness of the thin coloring matter layer is suitably in the range of 100–5000 Å (0.01–0.5μ) and preferably in the range of 200–600 Å (0.02–0.06μ). In case this thickness is less than 100 Å the sensitivity of the layer deteriorates, and if this thickness is over 5,000 Å the sensitivity of the layer deteriorates, too, and additionally the S/N ratio lowers.

The adhesive layer (or undercoat) may be interposed between the substrate and the thin coloring matter layer as occasion arises. Taking the thermal conductivity into consideration, this layer may be formed of heat insulating resin materials or inorganic materials by using the usual method of vapor deposition, coating or the like. As the resins used herein there can be enumerated vinyl chloride resin, vinyl acetate resin, acrylic or methacrylic resin, polyester such as polyethylene terephthalate, celluloses such as nitro-cellulose, polyamide, polycarbonate, epoxy resin, polyimide, polysulfone, and the like. As the inorganic compounds used herein there can be enumerated SiO, $SiO_2$, $TiO_2$ and the like. The use of polyimide and polysulfone is particularly preferable. The thickness of the adhesive layer is in the range of about 0.05 to 10 μm, preferably in the range of about 0.1 to 0.5 μm.

The protective layer may be provided on the thin coloring matter layer as occasion arises. This layer may be formed by using the usual method of vapor deposition, coating or the like, and its thickness is suitably in the range of about 0.1 to 10 μm, preferably in the range of about 0.5 to 1.0 μm. The materials used in the formation of the protective layer may be either organic or inorganic so long as the thin coloring matter layer is protected thereby.

Concrete examples of organic materials are disclosed in Japanese Laid Open Patent Application No. 96716/1974 Specification, Japanese Laid Open Patent Application No. 59626/1976 Specification, Japanese Laid Open Patent Application No. 75523/1976 Specification, Japanese Laid Open Patent Application No. 88024/1976 Specification, Japanese Laid Open Patent Application No. 134633/1976 Specification and the like. Among them, polystyrene, polyethylene terephthalate and ethylene-vinyl acetate copolymer are used profitably. As the concrete examples of inorganic materials, on the other hand, there may be enumerated $Al_2O_3$, $SiO_2$, SiO, MgO, ZnO, $MgF_2$, $CuF_2$ and the like.

Concerning the laser beams to be applied to the optical information recording medium according to the present invention, there is necessity of selecting them depending on the wavelengths the coloring matters to be used absorb. Accordingly, the $N_2$, He-Cd, Ar, He-Ne, ruby, coloring matter, and semi-conductor laser beams are selected according to the respective coloring matters.

BRIEF DESCRIPTION OF THE DRAWING

The FIGURE illustrates the reflective percentages of cyanine coloring matters used in Examples 1 to 5. In the drawing, curves 1 to 5 correspond to Examples 1 to 5 respectively.

EXAMPLES

The optical information recording mediums according to the present invention were prepared based on the conditions shown in the following table and subjected to information recording.

That is, 0.1 g of specified coloring matters were dissolved in 10 ml of specified solvents, the resultant solutions were once passed through a 0.4μ membrane filter, and thereafter these solutions were coated on substrates in a fixed film thickness by means of dipping method (dipping speed: 1.3 cm/sec.), and dried by using an infrared lamp, thereby obtaining optical information recording mediums with a bronze luster. Thus obtained recording mediums were exposed to laser radiation beam under the prescribed conditions to find that they could record information (pits) with uniform and clear configurations. In the following table, it is to be noted that ① the writing by semi-conductor laser was carried out using the laser beam of 820 nm wavelength and 1.54 μm beam diameter and under the conditions: power at the recording surface 5 mW, writing wavelength 0.5 MHz and linear velocity 1.5, and ② the writing with He-Ne laser was carried out using the laser beam of 632.8 nm wavelength and 2.4 μm beam diameter under the conditions: power at the recording surface 8 mW, writing wavelength 0.8 MHz and linear velocity 2.0 m/sec. The S/N ratios were measured at the IF (scanning filter) band width of 30 KHz.

The reflection percentages of cyanine coloring matters used in Examples 1 to 5 are as shown in the drawing. In the drawing, curves 1 to 5 correspond to the cyanine coloring matters used in Examples 1 to 5 respectively.

| Example No. | Coloring matter | Solvent | Film thickness (μ) | Substrate | S/N (dB) resultant from writing and reading with He—Ne laser | S/N (dB) resultant from writing and reading with semiconductor laser (820 nm) |
|---|---|---|---|---|---|---|
| 1 | [structure: bis-benzothiazole with -CH=CH-CH= bridge, N-C₂H₅, Br counterion] | methanol | 0.4 | glass | 50 | — |
| 2 | [structure: bis-benzothiazole with -CH=C(CH₃)-CH= bridge, N-C₂H₅, Br counterion] | methanol | 0.25 | glass | 40 | — |
| 3 | [structure: bis-benzothiazole with -(CH=CH)₃CH= bridge, N-C₂H₅, Br counterion] | methylene dichloride | 0.11 | acrylic resin | — | 35 |

| Example No. | Coloring matter | Solvent | Film thickness (μ) | Substrate | S/N (dB) resultant from writing and reading with He—Ne laser | S/N (dB) resultant from writing and reading with semiconductor laser (820 nm) |
|---|---|---|---|---|---|---|
| 4 | (structure with two quinoline rings, N-C₂H₅, I⁻, linked by +CH=CH+₃CH=) | methylene dichloride | 0.08 | acrylic resin | — | 48 |
| 5 | (benzothiazole-benzoxazole structure, N-C₂H₅, I⁻, +CH=CH+₃CH=) | methylene dichloride | 0.07 | acrylic resin | — | 35 |
| 6 | (quinoline-type structure, N-C₂H₅/Br⁻, N-CH₃, +CH=CH+₂CH=) | ethanol | 0.05 | acrylic resin | 45 | — |
| 7 | (bis-benzothiazole with CH₃O substituents, N-C₂H₅, I⁻, +CH=CH+₂CH=) | methylene dichloride | 0.04 | acrylic resin | 45 | — |
| 8 | (bis-benzothiazole with CH₃, H₅C₂O, OCH₃ substituents, N-C₂H₅, I⁻, +CH=CH+₂CH=) | methylene dichloride | 0.05 | acrylic resin | 45 | — |
| 9 | (bis-thiazoline with C₆H₅ substituents, N-C₂H₅, I⁻, +CH=CH+₂CH=) | methylene dichloride | 0.04 | acrylic resin | 45 | — |
| 10 | (bis-naphthothiazole, N-C₂H₅, Br⁻, +CH=CH+₂CH=) | ethanol | 0.06 | acrylic resin | 47 | — |
| 11 | (bis-benzothiazole, N-C₂H₅, Cl⁻, +CH=CH+₃CH=) | ethanol | 0.06 | acrylic resin | — | 50 |
| 12 | (bis-naphthothiazole (reduced), N-C₂H₅, I⁻, +CH=CH+₃CH=) | methylene dichloride | 0.06 | acrylic resin | — | 45 |

-continued

| Example No. | Coloring matter | Solvent | Film thickness (μ) | Substrate | S/N (dB) resultant from writing and reading with He—Ne laser | S/N (dB) resultant from writing and reading with semiconductor laser (820 nm) |
|---|---|---|---|---|---|---|
| 13 | (structure with two quinoline units linked by –CH=CH–₃CH=, N–C₂H₅, Cl) | ethanol | 0.05 | acrylic resin | — | 50 |
| 14 | (benzothiazole dimer, –CH=CH–₂CH=, N–C₂H₅, I) | methylene dichloride | 0.06 | acrylic resin | 47 | — |
| 15 | (benzothiazole dimer, –CH=CH–₃CH=, N–C₂H₅, I) | methylene dichloride | 0.05 | acrylic resin | — | 47 |
| 16 | (benzothiazole structure with –CH=CH–₂C=CH–CH=CH–CH=, COCH₃, N–C₂H₅, ClO₄) | methylene dichloride | 0.04 | acrylic resin | — | 45 |
| 17 | (quinoline dimer, –CH=CH–CH=, N–C₂H₅, I) | methylene dichloride | 0.05 | acrylic resin | — | 45 |
| 18 | (benzothiazole dimer, –CH=CH–₂CH=, N–C₂H₅, Br) | methylene dichloride | 0.03 | acrylic resin | 45 | — |
| 19 | (complex structure with two chloro-benzothiazole units linked through cyclopentene bearing N(phenyl)₂, ClO₄⁻, N–C₂H₅) | methylene dichloride | 0.04 | acrylic resin | — | 47 |

We claim:

1. An optical information recording medium comprising a substrate and a recording layer superimposed on said substrate, said recording medium being adapted to have information recorded thereon in the form of pits in said recording layer, and being adapted to have said information read by a laser beam, wherein the improvement comprises said recording layer is a thin film consisting essentially of a cyanine dye.

2. A recording medium as claimed in claim 1, wherein said recording layer is formed by coating a liquid containing said cyanine dye onto said substrate.

3. A recording medium as claimed in claim 1, wherein said recording medium further comprises an adhesive layer interposed between said recording layer and said substrate.

4. A recording medium as claimed in claim 1, wherein said recording medium further comprises a protective layer formed on said recording layer.

5. A recording medium as claimed in claim 1, wherein said recording layer has pits formed thereon, which pits comprise said information.

6. A recording medium according to claim 1 wherein said cyanine dye is a compound having two unsubstituted or substituted nitrogenous heterocyclic rings which are bonded by at least one methine chain, substituted methine chain or a group having a substituted or unsubstituted methine chain.

7. A recording medium according to claim 6, wherein said cyanine dye has a positive charge.

8. A recording medium as claimed in claim 6, wherein said cyanine dye contains a positively charged quaternary nitrogen atom in one of said heterocyclic rings.

9. A recording medium as claimed in claim 1, wherein said recording layer has a thickness in the range of 100 to 5000 angstroms.

10. A recording medium as claimed in claim 9, wherein said recording layer consists of said cyanine dye and at least one additive selected from the group consisting of a binder, an antioxidant, an infrared light absorbing agent, an ultraviolet light absorbing agent, and a dye other than said cyanine dye.

11. A recording medium as claimed in claim 10, wherein said recording layer has a thickness in the range of 200 to 600 angstroms.

12. An optical information recording medium comprising a substrate and a thin recording layer superimposed on said substrate, said recording layer consisting essentially of at least one cyanine dye selected from the group of compounds having the formulas:

(1) 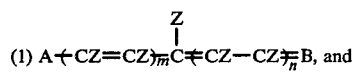

(2) 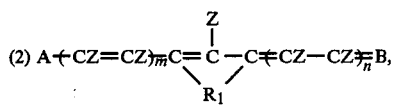

wherein $R_1$ is 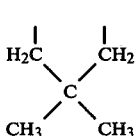; B is

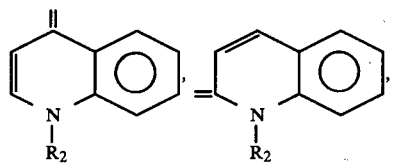

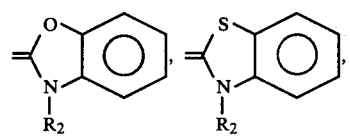

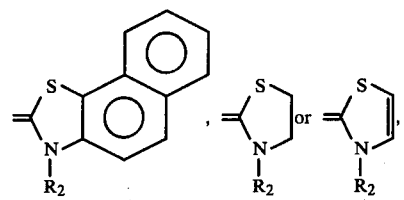

or an alkyl, alkoxy, hydroxy, acetyl, aryl or halogen substituted derivative thereof, in which $R_2$ is alkyl, alkoxyalkyl, hydroxyalkyl, aralkyl, carboxyalkyl, carboxylatoalkyl bonded with an alkali metal cation, sulfoalkyl or sulfonatoalkyl; A is

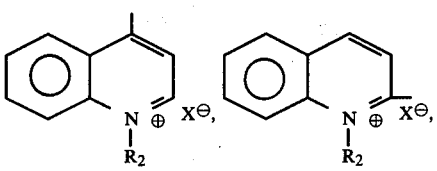

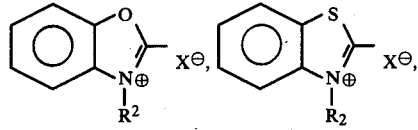

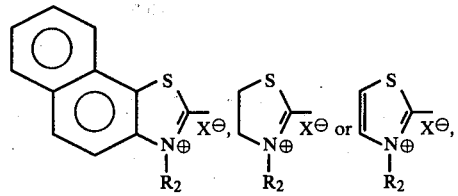

alkoxy, hydroxy, acetyl, aryl or halogen substituted derivative thereof, in which $R_2$ is the same as for B, and X is a counter ion; Z is H, —OH, —COOH, halogen, $C_1$-$C_5$ alkyl, phenyl, N-substituted amino, N-substituted alkyl, substituted or unsubstituted aryl, or —COOR′, wherein R′ is $C_1$-$C_5$ alkyl, phenyl or substituted phenyl, and Z, when plural, may be same or different; and m and n are each 0, 1, 2 or 3, with the proviso $m+n \leq 3$.

13. A recording material as claimed in claim 12, wherein said cyanine dye is a compound of said general formula (1).

14. A recording material as claimed in claim 12, wherein said cyanine dye is a compound of said general formula (2).

15. A recording medium as claimed in claim 12, in which Z is hydrogen and $R_2$ is alkyl.

16. A recording medium as claimed in claim 12, wherein said recording layer has a thickness in the range of 100 to 5000 angstroms.

17. A recording medium as claimed in claim 12, wherein said recording layer has a thickness in the range of 200 to 600 angstroms.

* * * * *

UNITED STATES PATENT AND TRADEMARK OFFICE
CERTIFICATE OF CORRECTION

PATENT NO. : 4 460 665
DATED : July 17, 1984
INVENTOR(S) : Makoto KUNIKANE et al It is certified that error appears in the above-identified patent and that said Letters Patent is hereby corrected as shown below:

Column 12, line 40; before "alkoxy" insert ---or an alkyl,---.

Signed and Sealed this

Twelfth Day of February 1985

[SEAL]

Attest:

DONALD J. QUIGG

Attesting Officer     Acting Commissioner of Patents and Trademarks